United States Patent
Seminel

(10) Patent No.: US 11,577,820 B2
(45) Date of Patent: Feb. 14, 2023

(54) PROPELLER BLADE ARRANGEMENT

(71) Applicant: Ratier-Figeac SAS, Figeac (FR)

(72) Inventor: Bruno Seminel, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 0 days.

(21) Appl. No.: 17/203,862

(22) Filed: Mar. 17, 2021

(65) Prior Publication Data
US 2021/0291961 A1 Sep. 23, 2021

(30) Foreign Application Priority Data
Mar. 19, 2020 (EP) .................................... 20315040

(51) Int. Cl.
*B64C 11/06* (2006.01)
*F01D 5/02* (2006.01)
*F01D 25/16* (2006.01)
*B64C 11/34* (2006.01)

(52) U.S. Cl.
CPC ............ *B64C 11/06* (2013.01); *B64C 11/343* (2013.01); *F01D 5/02* (2013.01); *F01D 25/16* (2013.01); *F05D 2240/50* (2013.01)

(58) Field of Classification Search
CPC ......... B64C 11/06; B64C 11/20; B64C 11/22; B64C 11/343; B64C 11/346; F04D 27/002; F04D 27/0246; F04D 29/056; F04D 29/323; F04D 29/362; F04D 29/366; F01D 7/00; F01D 7/02; F01D 25/16; F05D 2240/50; F05D 2260/70; F05D 2260/74; F05D 2260/79; F05D 2260/77

USPC .............................................. 416/50, 51, 139
See application file for complete search history.

(56) References Cited

U.S. PATENT DOCUMENTS

| | | | |
|---|---|---|---|
| 1,879,935 A * | 9/1932 | Hill | ........................ B64C 11/343 |
| | | | 416/136 |
| 2,241,055 A | 5/1941 | Chilton | |
| 2,423,752 A | 7/1947 | Biermann | |
| 2,528,236 A | 10/1950 | Hackethal et al. | |
| 2,570,484 A * | 10/1951 | Quinn | ................... B64C 11/343 |
| | | | 416/140 |
| 7,503,750 B1 | 3/2009 | Violette | |
| 9,239,040 B2 | 1/2016 | Leonard | |
| 2010/0003139 A1 | 1/2010 | Loos | |
| 2018/0029693 A1* | 2/2018 | Vander Lind | ........... B64C 11/46 |
| 2019/0136865 A1 | 5/2019 | Heinzen | |

FOREIGN PATENT DOCUMENTS

| | | | |
|---|---|---|---|
| GB | 434604 A * | 9/1935 | |
| WO | WO-2007/048517 A1 * | 5/2007 | ........... F03D 1/0608 |

OTHER PUBLICATIONS

English machine translation of WO-2007/048517-A1, Oct. 23, 2021.*
Extended European Search Report for International Application No. 20315040.4 dated Oct. 28, 2020, 8 pages.

* cited by examiner

*Primary Examiner* — Christopher Verdier
(74) *Attorney, Agent, or Firm* — Cantor Colburn LLP

(57) ABSTRACT

A propeller blade arrangement comprising a propeller blade attached to and rotatable with a hub, via a retention bearing, the blade being rotatable about a center line of the blade, the retention bearing configured to tilt the blade such that its center line is tilted with respect to the hub.

4 Claims, 4 Drawing Sheets

PROPELLER BLADE ARRANGEMENT

FOREIGN PRIORITY

This application claims priority to European Patent Application No. 20315040.4 filed Mar. 19, 2020, the entire contents of which is incorporated herein by reference.

TECHNICAL FIELD

The present disclosure is concerned with propeller designs for aircraft and with optimising the blade centrifugal restoring moment.

BACKGROUND

A propeller has a number of blades mounted around a hub. The hub and the blades set rotate around a hub axis. In addition, the individual blades are mounted to the hub by a retention bearing that allows the blade itself to rotate about an axis of rotation perpendicular to the hub axis. This enables the pitch of the blades to vary to adapt to different flight conditions and output power requirements.

The propeller is caused to rotate at different speeds and either in a forward or reverse mode of operation depending on the flight conditions. During climb, greater power and forward thrust are required. During the cruise phase, forward thrust moves the aircraft forward. During landing, the propeller is operated in reverse thrust mode to slow the aircraft down.

The engine torque applied to the blades via the propeller hub causes them to rotate and generate thrust, Airstream circulating around the different blade airfoil stations creates lift and drag forces at each station. The sum of the lift and drag forces generated along the blade generates shear loads and a high bending moment at the root of the blade where the retention bearing is located. The retention bearing has to be designed to have sufficient size and strength to withstand such bending forces. Modern propeller blades are designed to be as light as possible, whilst retaining strength. Composite materials allow blades to be manufactured that are strong and light, but the retaining bearings still need to be designed to withstand the bending forces that may act on the root of the blade as well as, to a lower degree, the G and shear forces. This provides a limitation on how much the size and weight of the overall propeller assembly can be reduced.

One way of reducing the effect of aero-forces on the blade is to balance them out by generating an opposing centrifugal bending moment—a restoring bending moment—from the G-forces generated by rotation of the propeller. Creating a restoring bending moment in the same plane but in essentially an opposite direction to the aero-bending moment means that these, when added together, will result in a reduced bending moment acting on the blade.

The way this centrifugal restoring bending moment is obtained is by designing the stacking of the blade—i.e. the structure of its airfoil sections—so that the centre of gravity of the blade is offset relative to its centreline and thus its axis of pitch change rotation. The direction and magnitude of the offset, CG offset, relative to the centreline is selected to optimize the restoring moment for given operating conditions. The restoring bending movement varies with rate of rotation, weight of the blade and CG offset.

The restoring bending moment is generally equal to:

$G_{LOAD} \times CG$ offset where:

$$G_{LOAD} = W \times \left(RPM \times \pi \times \frac{2}{60}\right)^2 \times R$$

where W is the weight of the blade, RPM is the rotation rate of the blade and R is the radial distance between the centre of gravity of the blade and the centreline (axis of rotation) of the propeller.

Typically, the blade will be designed with a centre of gravity to generate an optimal restoring moment—i.e. a centrifugal bending moment—in magnitude and opposite to the aero-bending moment for initial climb conditions. These are the conditions when power and airstream forces are usually at a maximum. The stacking will offset the centre of gravity in such conditions such that the total bending moment is very significantly reduced.

Whilst this works well in the operating conditions for which the blade is stacked to minimise the total bending moment, the design can be detrimental for that blade in other flight conditions.

In particular, when a propeller operates in a reverse thrust mode, e.g. during landing, the pitch angle of the blades is different and the aero-forces are acting on the other side of the blade, and the offset centre of gravity causes a different centrifugal bending moment. The total bending moment, from adding the aero-bending moment and the centrifugal bending moment will, in reverse thrust operation, no longer be minimised—rather, it may actually be increased by a factor, due to the moments acting essentially in the same direction and the restoring bending moment thus having an additive rather than a subtractive effect on the aero-bending moment.

There is a need to provide a propeller design which can optimise restoring moment in different operating conditions.

SUMMARY

Accordingly, there is provided a propeller blade arrangement comprising a propeller blade attached to and rotatable with a hub, via a retention bearing, the blade being rotatable about a centreline of the blade defined by the axis of rotation of its retention bearing, the retention bearing configured to tilt the blade such that its centreline is tilted with respect to the hub (ie, blade centreline does not intersect the hub centreline and/or is not orthogonal to the hub centreline).

The blade can be constructed such that its centre of gravity is offset with respect to its centreline. Alternatively, it can be constructed so that it is aligned with it.

Also provided is a propeller comprising a hub and a plurality of blades mounted about the hub each by a respective retention bearing, whereby the retention bearings are configured to tilt the blades such that their centrelines are tilted with respect to the hub. The centreline of the blade should not intersect and/or be perpendicular to that of the hub.

A method of operating a propeller comprising rotating the propeller in a first direction and tilting one or more blades of the propeller relative to the hub by an amount to position the center of gravity of the blade at a location whereby a centrifugal bending moment is generated to counteract an aero-bending moment acting on the blade is also provided.

DETAILED DESCRIPTION

The described embodiments are by way of example only. The scope of this disclosure is limited only by the claims.

Figure 1A:
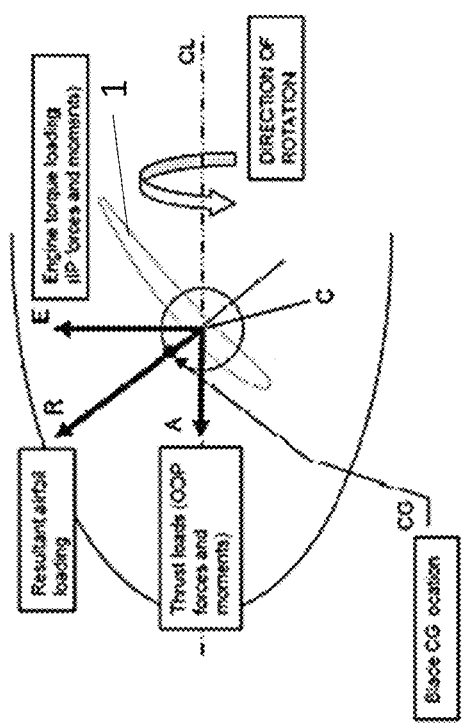
FIGS. 1A and 1B show the forces acting on a blade as in known arrangement in a forward thrust mode.
Figure 1B:
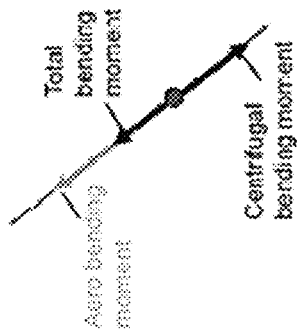

Referring first to FIGS. 1A and 1B, existing arrangements for generating a blade centrifugal restoring moment will be briefly explained.

A blade 1 is shown having a centreline C about which the blade rotates. In the example shown, it is calculated that in a forward thrust operation in 'cruise mode', the engine torque loading E and the external thrust loads A will combine to generate a resultant aero bending moment R on the blade retention with direction located in the fourth quadrant. In order to generate a restoring centrifugal bending moment that will counter the loading on the blade, the blade will be constructed or stacked so that its center of gravity CG is offset relative to its centreline C. The azimuthal location of the center of gravity will be determined so that, as shown in FIG. 1B, the centrifugal bending moment will be in the same plane or as close as possible to, but in the opposite direction to the aero-bending moment R ($2^{nd}$ quadrant). Under these flight conditions, therefore, the sum of these moments will result in an optimally small total bending moment. CL indicates the centreline of the hub.

Figure 2B:
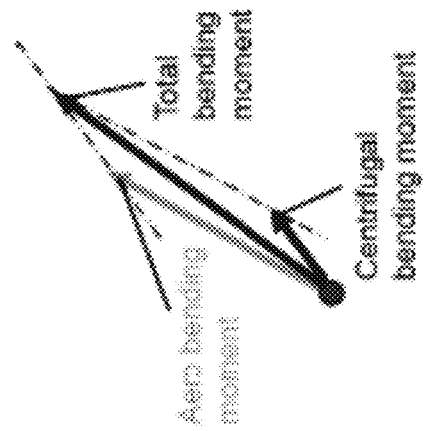
FIGS. 2A and 2B show the forces acting on a blade as in known arrangement in reverse thrust mode.
Figure 2A:
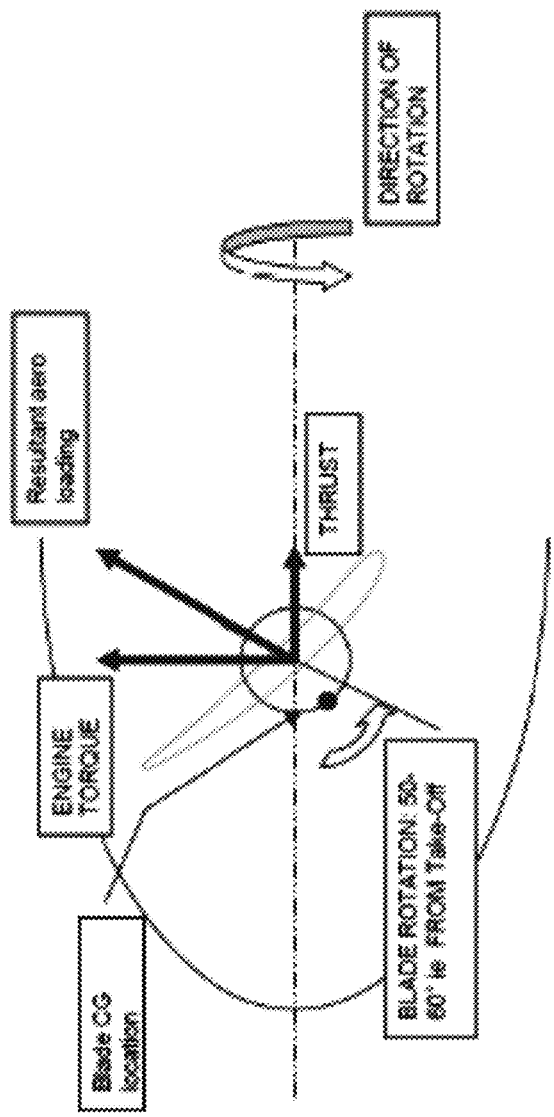

FIGS. 2A and 2B, however, show the forces on this blade 1 when the pitch of the blade rotates to reverse thrust mode angle. The direction of the thrust A acting on the blade, is now opposite to the direction shown in FIGS. 1A and 1B while the direction of the torque loading remains the same. Resultant bending moment R on the blade retention direction is therefore located in the first quadrant. The location of the centre of gravity which rotated with the blade now gives rise to a centrifugal bending moment that is no longer in the opposite direction to the aero-bending moment and, instead, is essentially in the same direction (also $1^{st}$ quadrant). When added, therefore, these moments give rise to a greater total bending moment—i.e. to a total bending moment that is actually greater than the aero-bending moment itself. As mentioned above, the retaining bearings need to be designed to be able to withstand this bending moment.

In the arrangement of the present disclosure, the situation in forward thrust is the same as shown in FIGS. 1A and 1B.

Figure 3B:
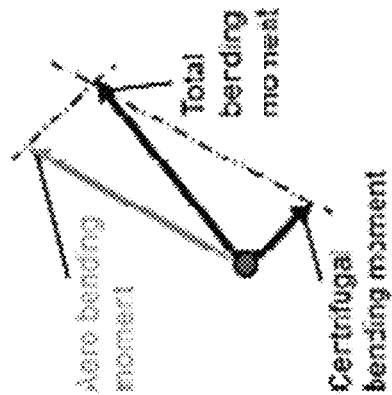
FIGS. 3A and 3B show the forces acting on a blade in reverse thrust mode according to the arrangement of the disclosure.
Figure 3A:
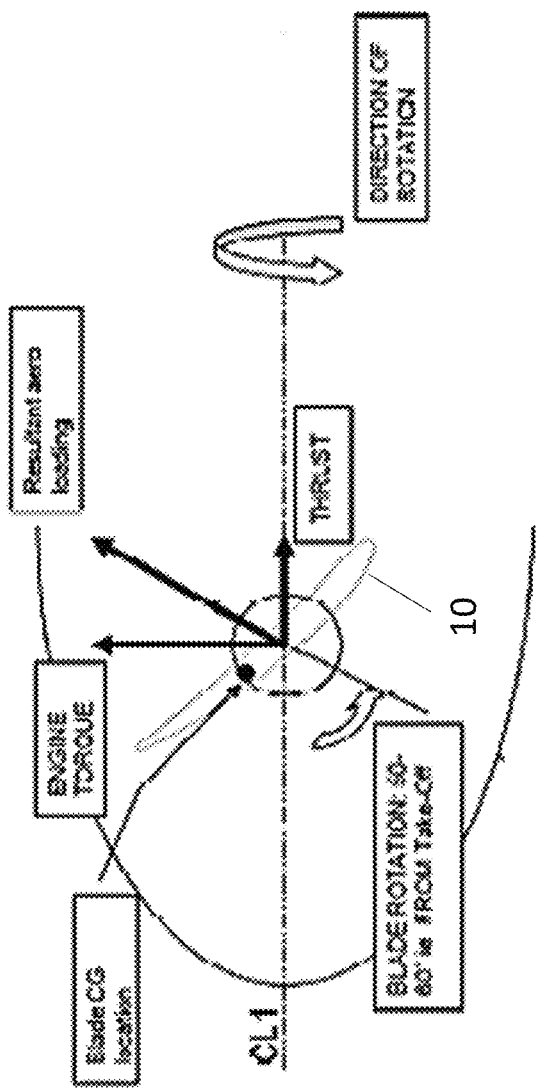

The blade 10, according to this disclosure, is attached to the propeller hub via a retention bearing 20 which allows rotation of the blade about bearing centreline to adjust and vary blade pitch. Hub arms incorporating the retention bearings 20 are designed so the blade can be tilted in the hub 30. By tilting the blade retention bearing 20, the blade centreline CL1 is tilted such that the location of the blade center of gravity CG1 is offset as compared to an axis going through the center of the retention bearing and intersecting/ perpendicular to the hub centreline to get a restoring moment that subtracts from the aero bending moment for flight condition such as Take-off as detailed in the background description. In reverse thrust mode, as shown in FIG. 3A, the offset of the CG1 position caused by the tilting does not rotate with the blade and remains constant in magnitude and azimuth as compared to the hub reference axis (still $2^{nd}$ quadrant). Consequently, the resulting restoring bending moment does not add significantly to the aero-bending moment.

The forces acting on the blade 10 will be the same as described with respect to FIG. 2A in reverse thrust mode but, because the CG1 offset contribution from tilting does not rotate with the blade and retains at least part of the relative location of the center of gravity CG1, the centrifugal bending moment will be at or around a 90° angle with respect to the aero-bending moment that is shown in FIG. 2B and will not add much or could even counter some of the aero-bending moment.

The sum of the aero-bending moment and the centrifugal bending moment will then result in a total bending moment that is almost equal or even less than the aero-bending moment.

The blades and the hub can be designed by varying the location of CG1 and/or the angle $\alpha$ of tilt, to optimise the total bending moment in different flight conditions.

Figure 4:
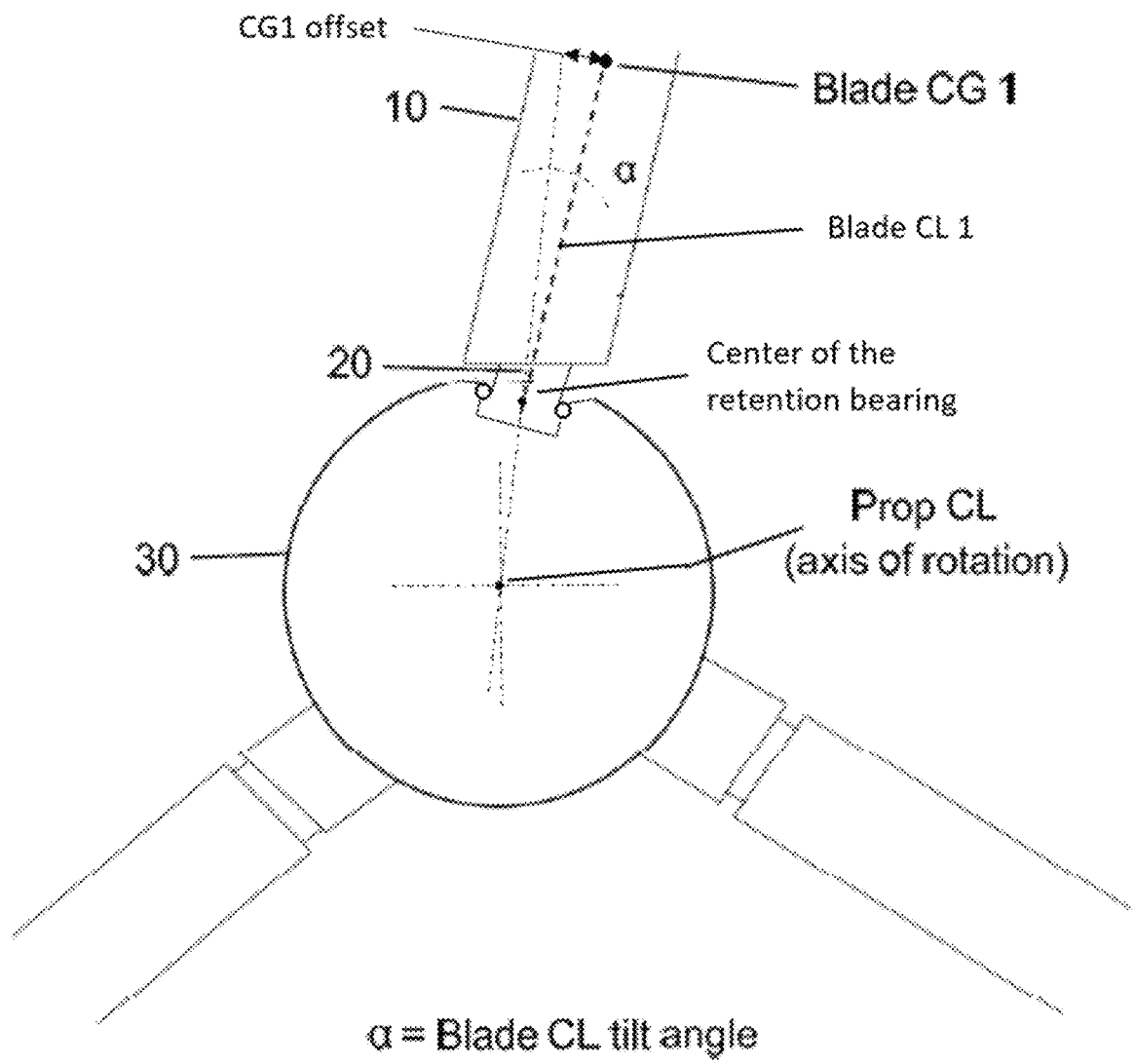
FIG. 4 is a schematic view of the blade arrangement of the disclosure.

FIG. 4 shows, schematically, how the blade can be tilted, at the bearing, relative to the hub, such that its centreline CL1 is tilted relative to the centreline CL defined by the hub 30.

Because the arrangement avoids loading much greater than the aero-bending moment, the bearing design for the worst-case scenario can be smaller and lighter. This also provides the possibility of engaging reverse thrust at greater airspeeds without over-stressing the retention bearings.

It is envisaged that the concepts described and claimed herein could be applied to any propellers or fans, not just aircraft propellers.

The invention claimed is:

1. A propeller blade arrangement comprising:
a hub;
a retention bearing; and
a propeller blade attached to the hub via the retention bearing and rotatable with the hub;
wherein the blade being rotatable about a centreline of the blade defined by an axis of rotation of the retention bearing, the retention bearing configured to tilt the blade relative to the hub such that the centreline is tilted with respect to the hub such that the centreline of the blade does not intersect the centreline of the hub and is not orthogonal to the centreline of the hub; and
wherein, in a forward thrust mode of operation, the blade is arranged such that its centre of gravity is offset in a direction and by a magnitude that generates a restoring bending moment that reduces a total bending moment to counteract an aero-bending moment acting on the blade; and
wherein, in a reverse thrust mode of operation, the angle of tilt is selected such that the blade centreline is tilted such that a location of the centre of gravity of the blade compared to the hub is the same as in the forward thrust mode of operation.

2. A propeller blade arrangement as in claim 1, wherein the blade is constructed such that its centre of gravity is offset with respect to the centreline.

3. A propeller blade arrangement as in claim 1, wherein the blade is constructed such that its centre of gravity is aligned with the centreline.

4. A propeller blade arrangement comprising:
a hub; and
a plurality of blades mounted about the hub each by a respective retention bearing,
whereby the retention bearings are configured to tilt the blades such that their centrelines are tilted with respect to the hub such that the centrelines of the blades do not intersect the centreline of the hub and are not orthogonal to the centreline of the hub; and wherein, in a forward thrust mode of operation, the blades are arranged such that their centres of gravity are offset in a direction and by a magnitude that generates a restoring bending moment that reduces a total bending moment to counteract aero-bending moments acting on the blades; and wherein, in a reverse thrust mode of operation, the angle of tilt is selected such that the centrelines of the blades are tilted such that the locations of the centres of gravity of the blades compared to the hub are the same as in the forward thrust mode of operation.

\* \* \* \* \*